Nov. 1, 1938.                A. R. LONG                2,135,405
                              MINE CAR
                         Filed April 16, 1934         7 Sheets-Sheet 1
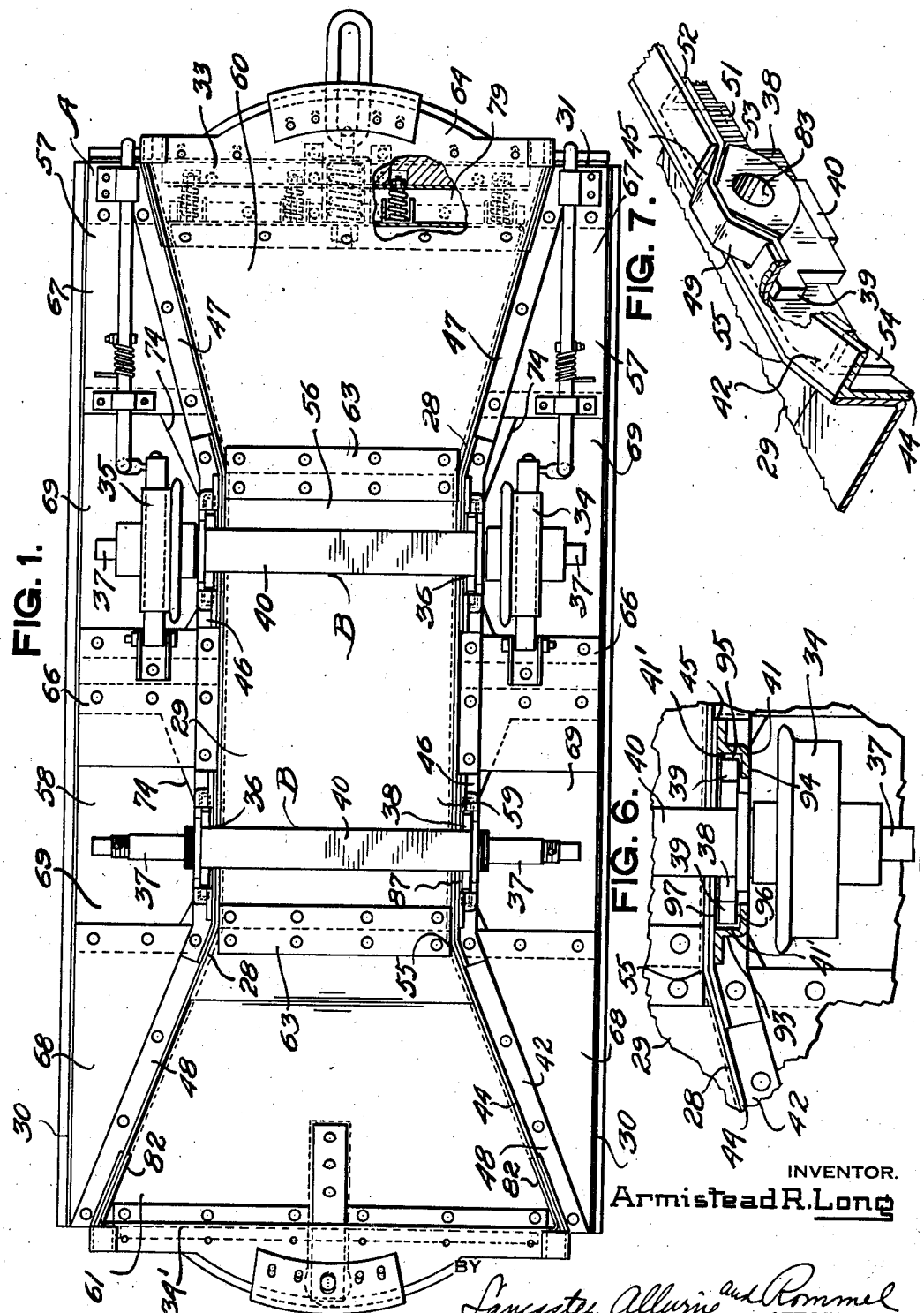
INVENTOR.
Armistead R. Long
ATTORNEYS.

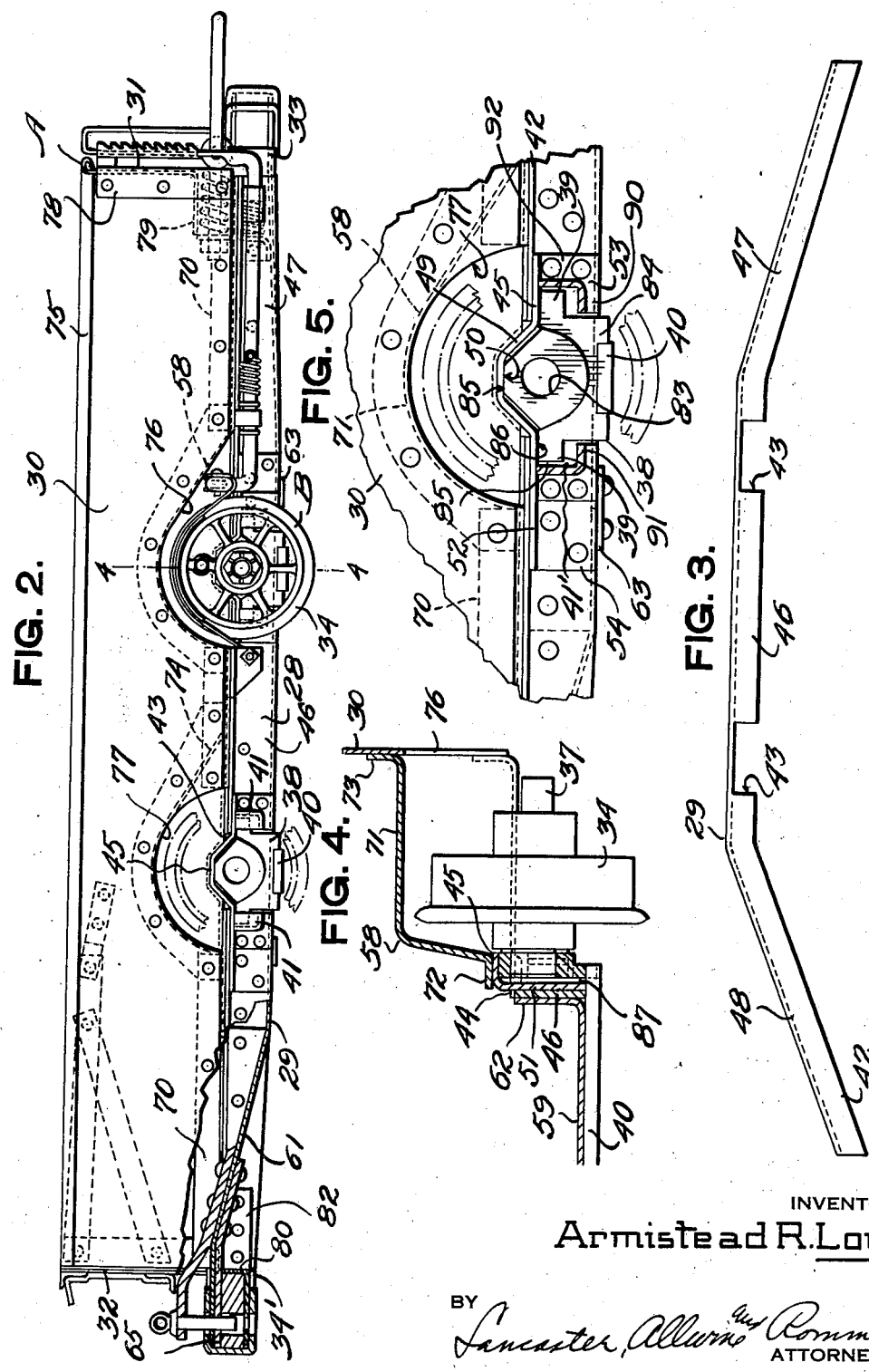

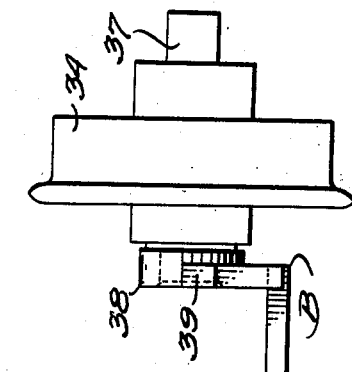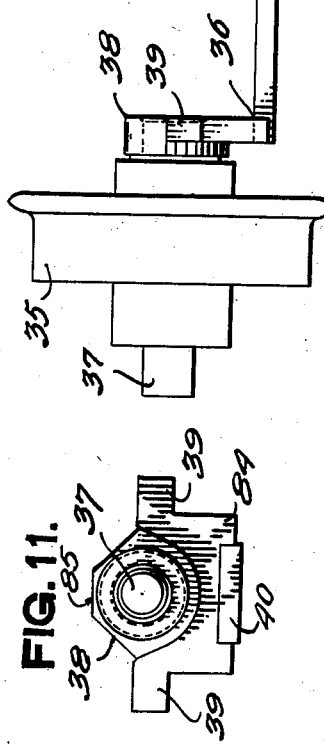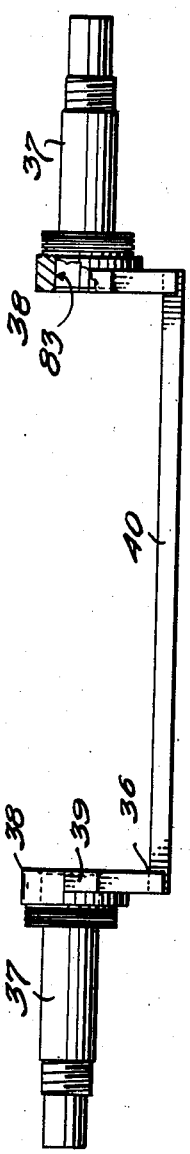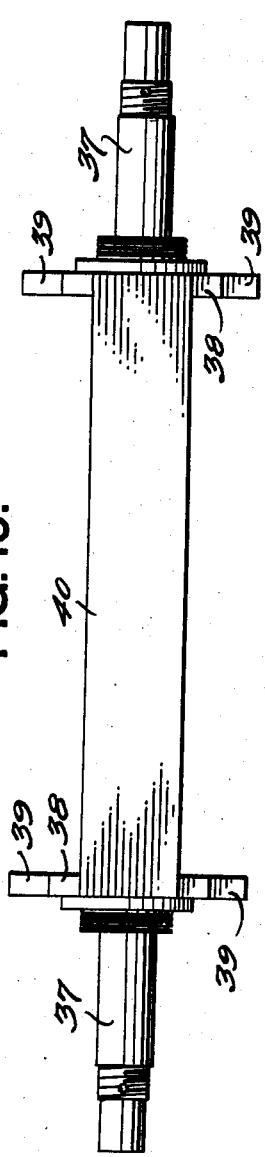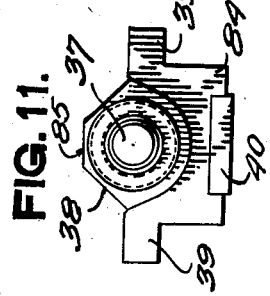
INVENTOR.
Armistead R. Long
BY Lancaster, Allwine and Rommel
ATTORNEYS.

Nov. 1, 1938.   A. R. LONG   2,135,405
MINE CAR
Filed April 16, 1934   7 Sheets-Sheet 4
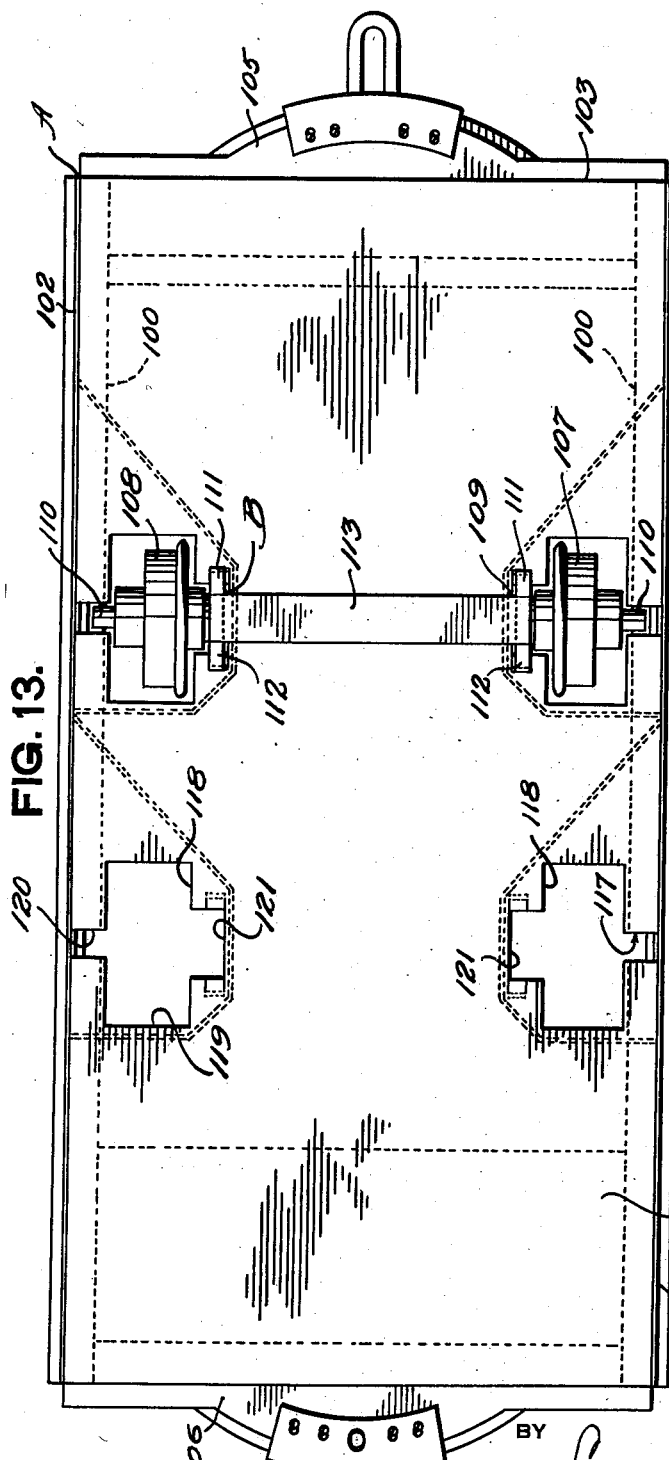
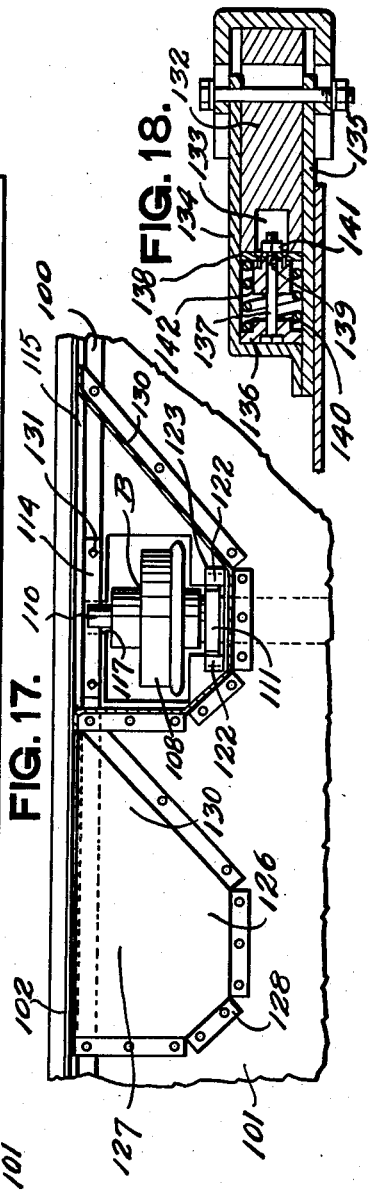
INVENTOR.
Armistead R. Long
BY Lancaster, Allwine & Rommel
ATTORNEYS.

Nov. 1, 1938.   A. R. LONG   2,135,405
MINE CAR
Filed April 16, 1934   7 Sheets-Sheet 5
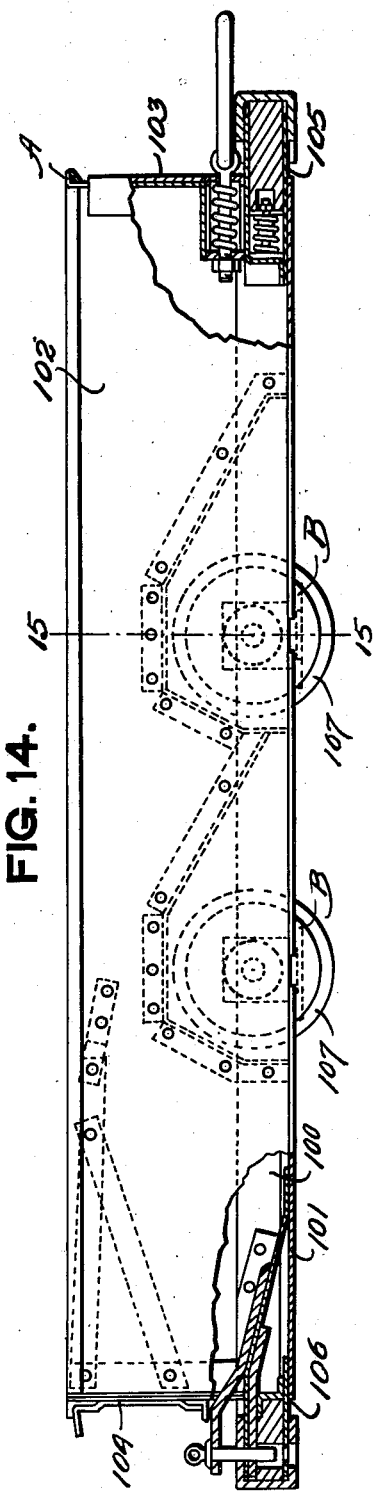
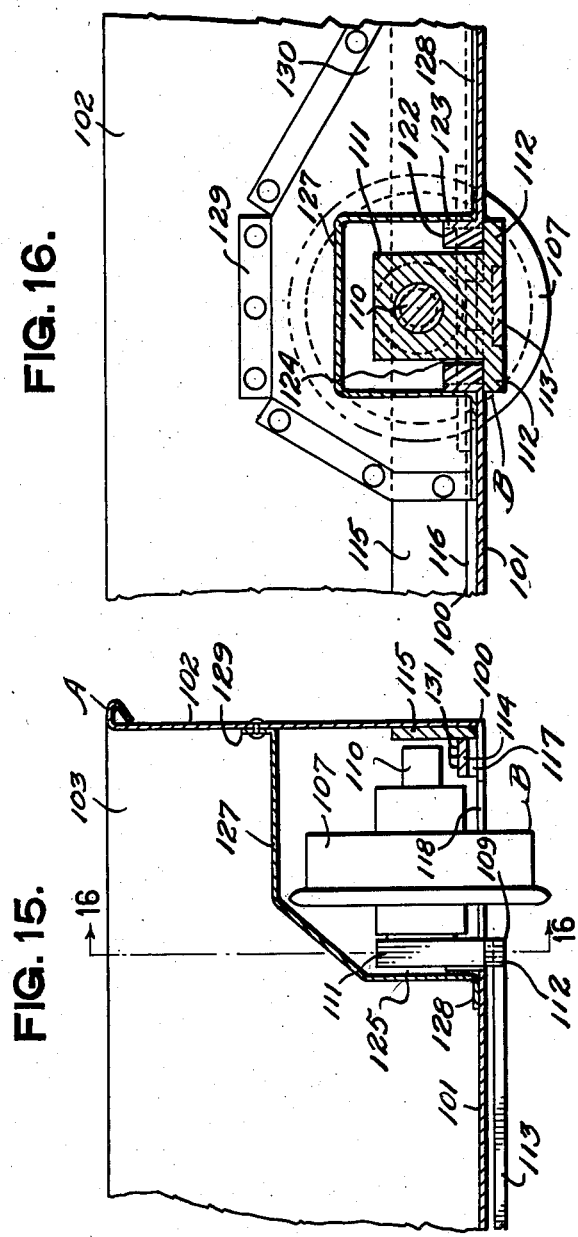
INVENTOR.
Armistead R. Long
BY
ATTORNEYS.

Nov. 1, 1938.　　　A. R. LONG　　　2,135,405
MINE CAR
Filed April 16, 1934　　　7 Sheets-Sheet 6
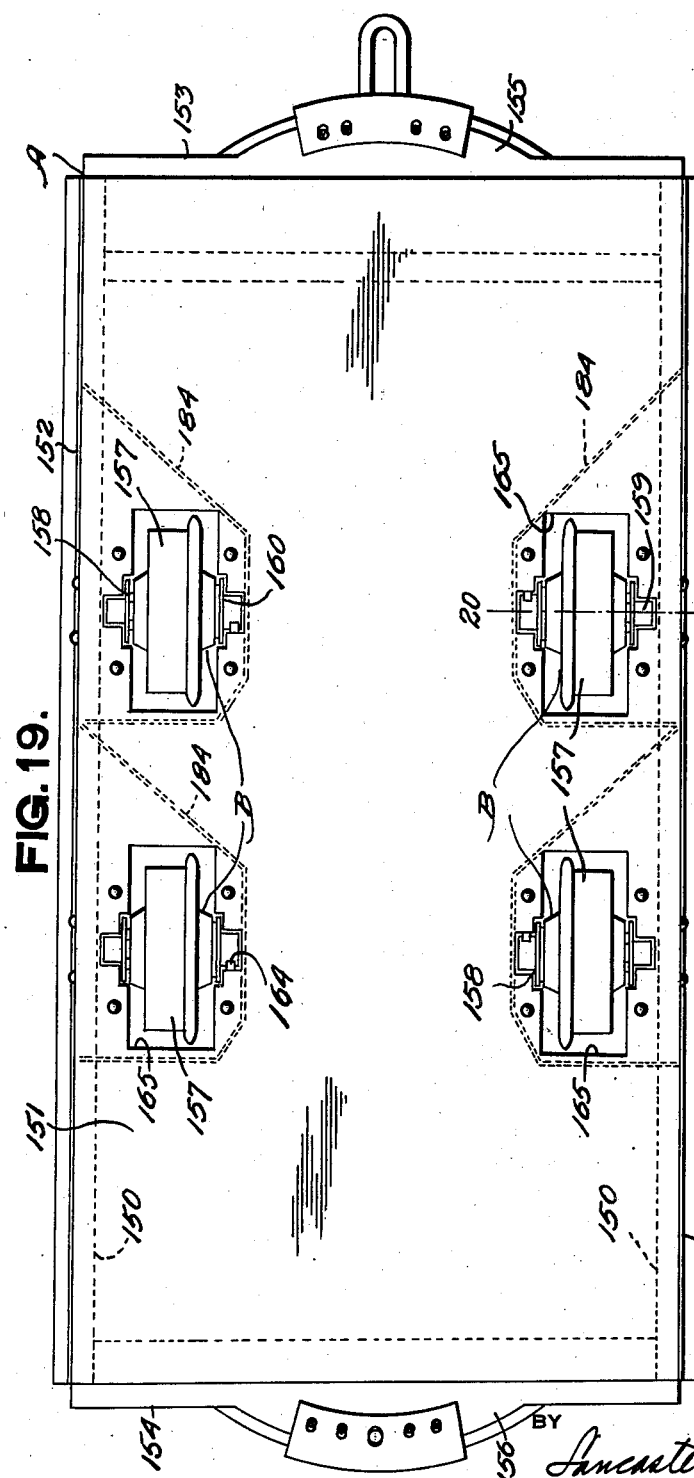
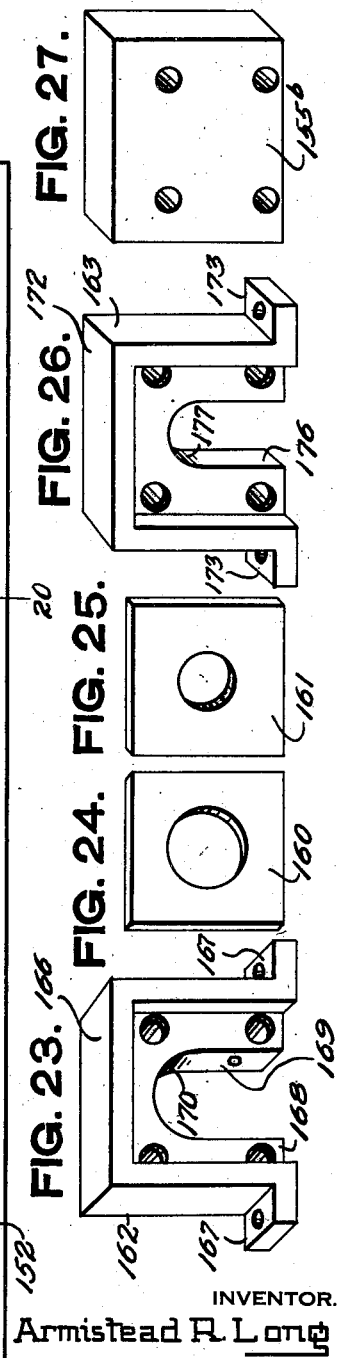
INVENTOR.
Armistead R. Long
BY
Lancaster, Allwine and Rommel
ATTORNEYS.

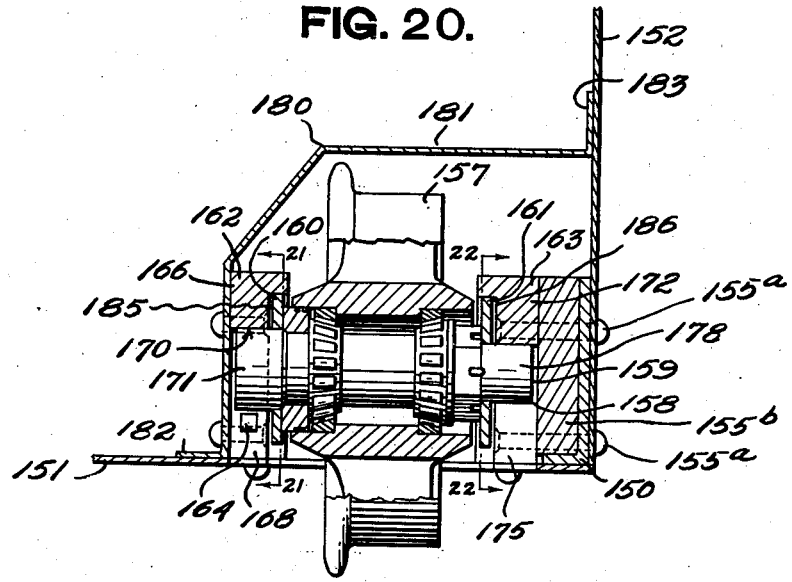
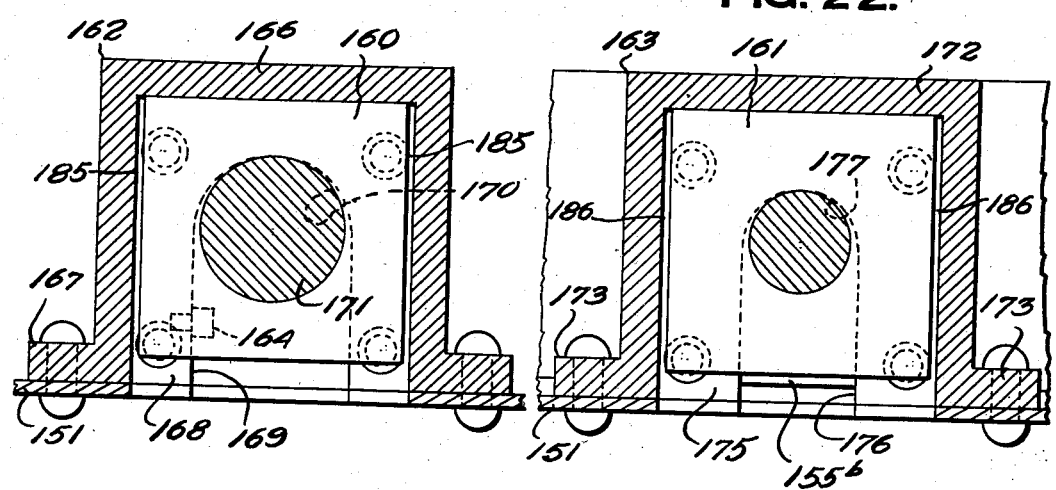

Patented Nov. 1, 1938

2,135,405

UNITED STATES PATENT OFFICE 2,135,405

MINE CAR

Armistead R. Long, Summerlee, W. Va., assignor to Long Super Mine Car Company, Oak Hill, W. Va., a corporation of West Virginia Application April 16, 1934, Serial No. 720,904

9 Claims. (Cl. 105—364)

The present invention relates to improvements in industrial cars, such as those used in mines and quarries.

The principal object of the invention is to provide industrial cars having unusual capacity for carrying large and heavy loads, and which are durable and have that flexibility desirable where cars must pass over irregular tracks and around sharp curves.

Another object of the invention is to provide industrial car bodies which are readily detachable from the wheels and mountings thereof and which bodies are strong and durable, yet comparatively light in weight considering their capacity for large and heavy loads. This is in part due to the manner in which the side sills are connected to the bottoms, sides and ends thereof, so that substantially rigid bodies are provided which will not warp, and droop or swag at ends or sides even tho frequently carried over uneven tracks.

A further object of the invention is to provide industrial cars where the wheel axles have floating relationship with the bodies in that the axles have slight play up and down, forwardly and rearwardly, and toward and from the longitudinal axes of the car bodies, giving flexibility between the car bodies and the wheeled supports, in such a manner as to allow the wheeled supports to follow irregular surfaces of tracks and the bodies to follow in the general line of draft without undue strain on the bodies and without the likelihood that the car will become derailed when one of four or more of the wheels of the car passes over a declivity in one of the rails of the track.

A still further object of the invention is to provide wheeled supports for industrial car bodies so formed and constructed as to permit carrying the bodies low, near the tracks, thereby greatly increasing their capacities for large loads.

Recent developments in industrial cars tend toward the provision of deep side sills and supporting of the central floor sections of the body bottoms low down between the wheels for increased capacity. These deep sills are heavy and call for side or step-like floor sections of the body bottoms running along both sides of each central floor section, which are flush with or above the top margins of the deep sills. It is another object of the present invention to provide constructions which will enable these side floor sections to be placed near the plane of the central floor section or to entirely eliminate the step-like floor sections thereby greatly increasing the capacity of the car so constructed, over the many types recently developed and above referred to.

A further object of the invention is to provide industrial cars where housings or hoods of dome-like formation projecting upwardly above the floor sections to accommodate the wheels and keep material from dropping from the bodies, are so shaped, in end dump cars, as to occupy as little material carrying space as possible and yet not impede the flow of material from the bodies when dumped.

Another object of the invention is to provide mine cars of greater capacity, consistent with over-all dimensions, than the mine car shown in my United States Patent 1,834,463 granted December 1, 1931. This is in part accomplished by having the ends of stub axles of wheeled mountings for the bodies in confronting relation to imperforate portions of the side sills, and relatively flat axle holding blocks interposed between the wheels and side sills.

Other objects and advantages of the invention will appear in the following detailed description, taken in connection with the accompanying drawings, forming a part of this specification, and in which drawings:—

Figure 1 is a bottom plan view of a mine car constructed according to the present invention, a portion of the wheeled support being removed to disclose details and a portion of the car body bottom being broken away with a combined end sill and bumper construction shown in horizontal section.

Figure 2 is a view partly in side elevation and partly in central vertical section of the car.

Figure 3 is a top plan view of a suitable side sill forming a part of the car body.

Figure 4 is an enlarged detailed vertical sectional view on the line 4—4 of Figure 2.

Figure 5 is an enlarged detailed view partly in elevation and partly in vertical section of a portion of the car body and wheeled mounting, fragments of the wheel being shown by dot and dash lines.

Figure 6 is an enlarged detail view partly in plan and partly in horizontal section showing a portion of the car body and wheeled mounting therefor.

Figure 7 is a fragmentary perspective view of similar parts of the mine car and showing more particularly the relationship of portions of the wheeled mounting to the side sill of the car body.

Figure 8 is a view in elevation of one of the trucks or wheeled mountings for the car body.

Figure 9 is a similar view with the wheels removed.

Figure 10 is a view similar to Figure 9 but in bottom plan.

Figure 11 is an end elevation of the assembly shown in Figure 9.

Figure 12 is a perspective view of a retainer to assist in normally keeping the wheeled mounting from separating from the car body when the latter is lifted.

Figure 13 is a bottom plan view of a modified form of mine car, one of the wheeled mountings being removed to show details.

Figure 14 is a view partly in side elevation and partly in central vertical section thru the mine car shown in Figure 13.

Figure 15 is an enlarged vertical cross sectional view on the line 15—15 of Figure 14.

Figure 16 is an enlarged longitudinal sectional view on the line 16—16 of Figure 15.

Figure 17 is a fragmentary top plan view of a portion of the car body and wheeled mounting therefor, one of the wheel housings or hoods being shown in horizontal section.

Figure 18 is a detailed view in vertical section thru a portion of the combined end sill and bumper suitable for use at one end of an end dump car or a turnover car.

Figure 19 is a bottom plan view of a further modified form of mine car constructed according to the present invention.

Figure 20 is an enlarged sectional view on the line 20—20 of Figure 19.

Figures 21 and 22 are detailed sectional views on the lines 21—21 and 22—22 of Figure 20 looking in the direction of the arrows.

Figures 23, 24, 25, 26 and 27 are detailed perspective views of portions of the wheeled mountings suitable for use with the form of mine car shown in Figures 19–22.

Referring first more particularly to Figures 1–12, in the example shown A designates a car body comprising side sills 28, a bottom 29, side walls 30, end wall 31, end gate 32, and combined end sill and bumper structures 33 and 34' at the end wall and gate 31 and 32, respectively. The body in the example shown is provided with wheeled mountings or trucks B each comprising companion wheels 34 and 35; an axle structure 36 including stub axles 37 for the wheels, polygonal axle holding blocks 38 provided with oppositely extending lateral arms 39 and a tie bar 40 connecting the blocks 38; and retainers 41 which, in the example shown, cooperate with the side sills 28 to provide pockets 41' for the arms 39 to normally keep the wheeled mountings B from separating from the body A when the latter is lifted.

The side sills 28 are each preferably made wholly or partly of rolled angle section but it is to be understood that they may be of rolled Z-sections, channels or the like, or suitable plate sections may be utilized to form the side sills, or the side sills may be made integral with the car bottom. In the example shown each side sill comprises an upper horizontal flange 42 which may be cut away to provide recesses 43, as shown in Figure 3, a vertical web 44, and a bearing 45 for each recess 43, the bearing being shown more in detail in Figure 7. Each sill is preferably formed to provide an intermediate portion 46 and angular end portions 47 and 48, as shown in Figures 1 and 3 and in assembling these side sills relative to other portions of the car body they are arranged in spaced, side by side relation with their intermediate portions 46 parallel and their end portions 47 and 48 in outwardly diverging relation to or toward the corners of the car body. The recesses 43 are in the intermeditae portions 46 and the bearings 45 each have a saddle-like portion 49 extending upwardly thru the recess and having a flat under face 50 for engagement with an upwardly facing surface of the polygonal axle holding block 38. As clearly shown in Figure 7, the bearing 45 is angular in cross section, comprising a vertical web 51, riveted or otherwise secured to the web 44 of sill 28 and a horizontal flange 52 which underlies flange 42 of the sill. The saddle-like portion 49 may be a continuation and offset of flange 52. It is preferred to shape the bearing 45 so as to have a main body portion 53 which engages the intermediate portion 46 of the sill 28, and a minor angular portion 54 which engages the adjacent end portion of the side sill, so as to reinforce the bend or juncture 55 between the intermediate and end portions of the side sills.

As to the preferred type of bottom for a car having these side sills 28, it comprises a central floor portion 56, side floor portions 57 and wheel housings 58. The central floor portion 56 is conveniently made of an intermediate section 59 and end sections 60 and 61 which may be provided with upturned flanges 62, as shown in Figure 4, riveted, welded, or otherwise secured to the vertical webs 44 of the sills 28. This construction is preferred to the use of side sills of Z-section (not shown in the drawings) since the central floor portion does not rest upon a flange of the sill and the arrangement shown in Figure 4 gives added coal carrying space. It is to be noted that the central floor portion 56 is well below the tops of the side sills altho in an end dump car it is preferred that the end section 61 slant upwardly from adjacent the central section 59 toward the combined end sill and bumper structure 34', as shown in Figure 2. The sections 59, 60 and 61 may be joined together by tie plates 63. It is to be noted also that section 60 may be continued beyond the end sill 33 as at 64 to form a bottom plate of the bumper structure, and section 61 may be continued beyond the end sill 34 to form a part of the bumper structure, however, these characteristics of the bumper constructions are disclosed and claimed in my Patent No. 2,089,754, Aug. 10, 1937. The side floor portions 57 likewise may each comprise a central section 66 and end sections 67 and 68, the sections being spaced apart to provide wheel openings 69. These sections are mounted at the upper portions of the sills 28 and sections 67 and 68 have their inner margins conforming in plan to the angular end portions 47 and 48, respectively, of the side sills, as shown in Figure 1. Sections 66, 67 and 68 may each be provided with an upturned flange such as is shown at 70 in Figure 2, riveted, welded or otherwise secured to the side walls 30. These sections are also welded, riveted or otherwise secured to the horizontal flanges 42 of the sills 28. Each wheel housing is preferably a metal pressing comprising a dome portion 71, horizontal flange 72 adjacent the bottom of portion 71, and riveted, welded or otherwise secured to the side floor portions 57, and a vertical flange 73 likewise secured to the side walls 30. As shown more particularly in Figure 1 it is preferred to provide each wheel housing 57 with a portion 74 tapering in plan from adjacent the central section 59 of the car floor toward the side wall 30 and end wall 31, that is, toward the end wall which is opposite end gate 32. These housings 58 keep material from dropping thru the wheel openings 69 and occupy but little material carrying space in the body. They do not impede the flow of coal or other material from the bodies when dumped.

Each side wall 30 is preferably provided with an outturned bead 75 at its upper margin and is preferably cut away at its lower margin, as at 76 and 77 so as to permit the wheels of the mountings or trucks B to be removed laterally, without disturbing other portions of the mountings. The end wall 31 is preferably secured to the side walls 30 by flanges 78 and is preferably provided with a horizontal flange 79 at its lower end portion, forming a cover for spring means associated with the draft rigging. The end gate 32 may be of any approved construction and is shown merely by way of example as suitable equipment for an end dump car.

Except as hereinafter noted, the combined end sill and bumper structure 33 may be of any approved design, such as disclosed in my aforesaid Patent No. 2,089,754. It will be noted, as to the combined end sill and bumper structure 34 that it comprises a cross bar 80 extending from one sill 28 to the other sill and is provided with inturned flanges 82, riveted or otherwise secured to the diverging end portions 48 of the side sills, whereby the side walls 30, thru the floor section 68 and the end sill thru the flanges 82 are securely fastened to the side sills.

Referring now to the wheeled mountings or trucks B, the wheels 34 and 35 may be rotatably mounted on the stub axles 37 in any suitable manner. These stub axles are preferably shunk in openings 83 formed in the blocks 38. Each block 38 preferably comprises a polygonal main body portion 84 having a flat top face 85 normally engaging the under face 50 of bearing 45. The arms 39 extend laterally of the main body portion 84 and are also normally in surface contact with the under faces 86 of flanges 52 of bearing 45. In other words, the car body normally rests upon the wheeled mounting by engagement of its side sills wtih the arms 39 and main body portion 84 of the axle holding blocks. It is to be noted, however, that the saddle-like portion 49 is made sufficiently larger than the upper portion of the polygonal main body 84, to permit movement of the block 38 and the car body, one with respect to the other, longitudinally of the car. The tie bar 40 may be welded, riveted, or formed integral with the axle holding blocks and as shown in Figure 4 extends beneath the intermediate section 59 of the central floor portion of the car body. This tie bar is made sufficiently long, and the companion axle holding blocks 38 of each wheeled mounting B are spaced apart a distance appreciably greater than the spacing of the companion bearings 45, so that there is a space 87 between the inner vertical face of block 38, and the outer vertical face of web 51 of the bearing 45, when the car body is exactly centered upon the wheeled mounting. This permits sidewise movement of the wheeled mounting and car body, one with respect to the other and together with other characteristics hereinafter referred to permits a truly floating connection between the body and wheeled mountings, permitting the car body to follow in the general line of draft and the wheels to accommodate themselves to uneven tracks.

Instead of fixedly connecting the wheeled mountings B, so as to constitute a single unitary four wheel truck as in my former Patent 1,834,463, the wheeled mountings are free of one another so that the one mounting B may freely move to a position where the axis of the stub axles thereof is in angular relation to the car bottom, while the other mounting B may freely move to a position where the axis of the stub axle thereof is in a different angular relation to the car body, instead of the normal position where these mountings B have the axes of their stub axles parallel to the car bottom. In other words, the wheel 34 of one mounting B may drop down from a normal position when following a declivity in the rail on one side of the track, while the wheel 35 of the other mounting B may drop down from a normal position when following a declivity in the rail on the other side of the track.

The retainers 41 cooperate with the side sills 28 to provide pockets 41' for the arms 39. Each retainer preferably comprises a horizontal flange 90, a horizontal abutment flange 91, a vertical attaching flange 92, a vertical abutment flange 93 and a retaining wall 94 connecting the flanges 91 and 93 remote from the flanges 90 and 92, so that when the attaching flange 92 is riveted, welded or otherwise secured to the side sill, as shown in Figures 5 and 6, the pocket 41' is provided. It is to be noted, however, that normally there is a space 95 between the ends of the arms 39 and the vertical abutment flanges 93 of their respective retainers 41, and also spaces 96 and 97 between the outer and inner faces of these arms and the retaining wall 94 of the retainer 41, and the web 51 of bearing 45, respectively, permitting the wheeled mounting to shift laterally with respect to the car body, or the car body shift laterally with respect to the wheeled mounting. If the car body A is lifted, the arms 39 will contact the horizontal flanges 91 of retainers 41, and such will prevent separation of the wheeled mountings B from the car body.

The saddle-like portion 49 of bearing 45 permits the axle holding blocks to extend upwardly thru the recesses 43 in the side sills, yet effectively supporting the body by engagement of the side sills with the arms 39 and disposing the axis of the stub axle 37 of the block well above the central floor portion 56, thus providing a car of considerable capacity.

Referring now to the modification shown in Figures 13–18, the body A comprises side sills 100, a bottom 101, side walls 102, end wall 103, end gate 104, and bumper structures 105 and 106 at the end wall 103 and gate 104, respectively. The body in this example is provided with wheeled mountings B each comprising companion wheels 107 and 108; an axle structure 109 including stub axles 110 for the wheels, axle holding blocks 111 provided with laterally extending arms 112 near the bottoms of the blocks and a tie bar 113 connecting the blocks 111; and, retainers 114 associated in the example shown with the stub axles 110 to keep the wheeled mountings B from separating from the body A when the latter is lifted.

The side sills 100, in the example shown are preferably straight extending from one end to the other end of the car next adjacent to the side walls 102. Each sill comprises a vertical flange 115 and a horizontal inturned flange 116. Each horizontal flange 116 is provided with a recess or opening 117 thru which the stub axle 110 may pass when the body is lifted off the wheel mountings.

As to bottom 101, it differs from the form shown in Figures 1-12 in that it is preferably one solid flat sheet of metal elongate in shape and provided with wheel openings 118 in spaced apart relation longitudinally of the car and adjacent the side margins of the bottom. These wheel openings are shaped to provide a major portion 119 for the wheel and symmetrically located, oppositely disposed minor portions 120 and 121 for the stub axle 110 and the axle holding blocks 111, respectively.

Inasmuch as the lateral arms 112 are at the lower portions of the axle holding blocks 111, and the bearings 122 rigid with the car body normally rest upon these arms, it is to be observed that the stub axles 110 are located above the plane of the car bottom, thus locating the wheels with the major portions thereof above the plane of the car floor. The bearings 122 may be welded to upturned portions 123 of the car bottom to give more surface for the axle holding block 111 to pull against. It is to be noted, however, that there is a space 124 between these bearings 122 and the axle holding block 111, when the wheel mounting is centered in the wheel opening and also that there is a space 125 between the axle holding block and the wall defining portion 121 of the wheel opening which permits relative movement between the wheeled mounting and the car body laterally.

Housings or hoods 126 are provided similar to those designated 58 in the first described form and comprise a dome-like portion 127, a horizontal lower flange 128, riveted, welded, or otherwise secured to the bottom 101, and an upturned vertical flange 129 likewise secured to the side wall 102, which wall is also secured to the vertical flange 115 of the side sill 100. These wheel housings 126 are elongate in shape extending longitudinally of the car, over the wheels and have a portion 130, triangular in plan at their ends opposite the end gate 104 when the car is of the end dump type.

In order to prevent separation of the wheeled mountings B from the car body, when the latter is lifted, the retainers 114 are provided, and in the example shown comprise flat bars bolted as at 131 to the horizontal flange 116 of side sill 100. When in place these retainers are beneath the stub axles 110 and prevent same passing thru the portions 120 of wheel openings 118, as is obvious from an inspection of Figures 15 and 17.

In Figure 18 is shown the preferred end sill and bumper construction 103. It comprises a bumper block 132, recessed at its rear end as shown at 133, this block fitting between upper and lower horizontal plates 134 and 135, an abutment plate 136 to the rear of and spaced from bumper block 132, a plurality of parallel bolts 137 carried by plate 136 and extending toward the bumper block and into the recess 133 thereof, a second abutment plate 138 engaging the rear end of the bumper block and provided with openings 139 for slidably receiving the bolts 137, coil springs 140 encircling the bolts and interposed between the abutment plates, and nuts 141 on the bolts to limit the movement of the abutment plate 138 away from plates 136, responsive to expansion action of the springs. It is also preferred to provide sleeves 142 on the bolts, inside the springs, to engage both abutment plates to limit the movement of the plate 138 toward plate 136 upon impact upon the bumper block. This type of end sill and bumper construction may also be applied to the form of mine car shown in Figures 1-12, and some of the details are shown in dotted lines in Figure 1.

As to the modification shown in Figures 19-27, the body A comprises side sills 150, a bottom 151, side walls 152, end walls 153 and 154, and bumper structures 155 and 156 at the end walls 153 and 154, respectively. The body in this modification is provided with wheeled mountings B each comprising a wheel 157, an axle structure 158 including a stub axle 159 and holding blocks 160 and 161 of non-circular shape adjacent opposite ends of the axle; inner and outer bearings 162 and 163 carried by the car body, and a retainer 164 associated with the bearing 162, to keep the wheeled mounting from separating from the body A when the latter is lifted.

Insofar as the body A is concerned, it is very similar to the form shown in Figures 13-18, in that the bottom 151 is preferably one solid flat sheet of metal, with the wheel openings 165 similar in shape to those designated 118. In the present example, no tie bar similar to those designated 40 and 113 is provided connecting companion wheels at opposite sides of the car body.

The axle holding block 160 may be shrunk upon the stub axle 159 adjacent its inner end, but the axle holding block 161 may merely have a neat fit on the stub axle adjacent its other end, but not shunk thereon. The inner bearing 162 comprises a saddle 166 provided with lateral attaching flanges 167 at its lower ends, to be riveted, or otherwise secured to the car bottom 151. The saddle 166 is provided with an end flange 168, having a recess 169 terminating in an arcuate end wall 170, of a radius greater than the radius of axle portion 171 which projects thereinto, as shown in Figure 20. The outer bearing 163 is similar to bearing 162 in that it comprises a saddle portion 172, lateral attaching flanges 173 by which it may be riveted or otherwise secured to the car bottom 155 and to the end wall 152 by rivets 155a, a filler block 155b being interposed between bearing 163 and the wall 152 and resting on horizontal flange 174 of the side sill 150. The bearing 163 has an outer flange 175 provided with a recess 176 leading from its lower margin and terminating in an arcuate wall 177, of a radius greater than the radius of outer axle portion 178. The retainer 164 may comprise a stud bolt threaded into the flange 168 at the recess 169, as shown in Figures 20 and 21 to keep the wheel mounting from separating from the body A when the latter is lifted. A suitable housing or hood 180 is disposed over each wheel opening 165, each housing being similar to that previously described in that it comprises a dome portion 181, a lower horizontal flange 182, secured to the car bottom 151, and a vertical flange 183 attached to the side wall 152. This housing, when applied to a car of the end dump type is also provided with a portion 184, tapering in plan, or triangular in plan, as previously described, tapering from adjacent the central portion of the car body floor, toward that end of the car opposite the end gate thru which material may be dumped.

It is to be noted that there is space 185 between axle holding block 160 and flange 168 of inner bearing 162 and space 186 between axle holding block 161 and flange 175 of outer bearing 163, when the wheel mounting is centered. Also because the recesses 169 and 176 are wider than the diameters of the axle ends 171 and 178 which extend into these recesses, and the holding blocks 160 and 161 are of less width than the interior recesses of saddles 166 and 172 providing spaces 185 and 186 when the wheel mountings are centered in the saddles, the wheel mountings have a truly floating relationship to the bar body since they have limited movement longitudinally, laterally, and up and down, with respect to the car body, or the car body with respect to the wheel mountings. This is particularly advantageous to take care of unusual short curves in addition to permitting the wheels to follow irregular or undulating rails without becoming derailed, while the body remains in the general line of draft.

While the foregoing description and the drawings are directed to end dump cars, it will be apparent from the description that within the spirit of the invention both ends of the car may be provided with fixed end walls to provide a rotary dump car if desired.

What is claimed is:

1. A mine car comprising a body including side sills, wheeled mountings for the body, each comprising a wheel, a stub axle for the wheel and a polygonal holding block rigid with the axle and disposed laterally of the side sill with the inner end of the axle in confronting relation to an imperforate portion of the adjacent side sill, and means carried by the car body for each of said holding blocks, said means embracing its respective block with slight play of the body upwardly, rearwardly and forwardly, and laterally with respect to the axle holding block whereby there is a floating connection between the body and wheeled mountings, permitting the car body to follow in the general line of draft and the wheels to accommodate themselves to uneven tracks.

2. In a mine car, a car body, at least two wheeled mountings for the body each mounting comprising companion wheels for opposite rails of the track, stub axles for the wheels, holding blocks rigid with the axles, said blocks each comprising a main body portion from which its respective axle extends and opposite laterally extending arms upon which the car body normally rests, and a tie bar connecting the blocks with the stub axles projecting in opposite directions, and retainers carried by the car body for engagement with the said arms of the wheeled mountings to normally keep the latter from separating from the body when the latter is lifted, said wheeled mountings being movable with respect to the body independently of each other.

3. In a mine car, the combination of a side sill including a vertical web and a horizontal flange outstanding from the upper portion of the web, said flange notched to provide a recess, a reinforcing filler secured to said side sill and including a saddle-like portion projecting above said flange at said recess, and horizontal flanges engaging the said sill flange at each side of said recess, a wheel mounting including a stub axle and an axle holding block secured thereto, said block including a polygonal main body portion having its upper portion extending into the saddle-like portion of said reinforcing filler but sufficiently smaller than the latter to permit movement of the block and sill one with respect to the other, longitudinally of the car, and arms extending laterally of the main body beneath the said sill flange to each side of the recess thereof, and a retainer for each of said arms of the axle holding block, secured to said side sill, each retainer providing a pocket receiving with longitudinal, transverse and vertical play, its respective axle block arm.

4. In a mine car, the combination of a side sill including a vertical web and horizontal flange outstanding from the upper portion of the web, said flange notched to provide a recess, a wheel mounting including a stub axle and an axle holding block secured thereto, said block including a polygonal main body portion having its upper portion extending above said sill flange thru said recess, and arms extending laterally of the block main body beneath the said sill flange, to each side of the recess thereof, and a retainer for each of said arms of the axle holding block, secured to said side sill, each retainer providing a pocket receiving with longitudinal, lateral and vertical play, its respective axle block arm.

5. In a mine car, the combination of a side sill including a vertical web and a horizontal flange outstanding from the upper portion of the web, said sill having an intermediate portion and angular end portions extending laterally to one side of the plane of the vertical web of the intermediate portion, and the said flange of the intermediate portion notched adjacent said angular ends to provide recesses, a reinforcing filler for each recess, secured to the side sill, including a main body portion secured to the vertical web of the intermediate portion of said side sill, a saddle-like portion carried by said main body portion and projecting upwardly thru its respective recess, horizontal flanges extending from each end of the saddle-like portion, beneath said flange of the side sill, and a minor angular portion extending from said main body and secured to the vertical web of the adjacent angular end portion of the side sill, a wheel mounting at each recess of the side sill, including a stub axle and an axle holding block secured thereto, said block including a polygonal main body portion having its upper portion extending into the saddle-like portion of said reinforcing filler but sufficiently smaller than the latter to permit movement of the block and sill one with respect to the other, longitudinally of the car, and arms extending laterally of the block main body beneath the said sill flange to each side of the recess thereof, and a retainer for each of said arms of the axle holding block, secured to said side sill, each retainer providing a pocket receiving with longitudinal, transverse and vertical play, its respective axle block arm.

6. In a mine car, the combination of a side sill including a vertical web and horizontal flange outstanding from the upper portion of the web, said flange notched to provide a recess, a reinforcing filler secured to said side sill and including a saddle-like portion projecting above said flange at said recess and horizontal flanges engaging the under face of said flange at each side of said recess, a wheel mounting including a stub axle and an axle holding block secured thereto, said block including a polygonal main body portion having its upper portion extending into the saddle-like portion of said reinforcing filler but sufficiently smaller than the latter to permit movement of the block and sill one with respect to the other, longitudinally of the car, and arms extending laterally of the main body beneath the said sill flange to each side of the recess thereof and normally engaging the said flanges of said reinforcing filler, and a retainer for each of said arms of the axle holding block, secured to said side sill, each retainer providing a pocket receiving with longitudinal, transverse and vertical play, its respective axle block arm.

7. In a mine car, the combination of a side sill including a vertical web and horizontal flange outstanding from the upper portion of the web, said flange notched to provide a recess, and a wheel mounting including an axle holding block extending upwardly thru said recess and an axle rigid therewith, with at least a portion of the axle above the plane of said horizontal flange.

8. In a mine car, a car body, wheeled mountings for the body comprising companion wheels, stub axles for the wheels, holding blocks rigid with the axles, said blocks each comprising a main body portion from which its respective axle extends and arms extending laterally from opposite sides and at the lower portion of the block in a plane normal to the axis of the axle, and upon which arms the car body rests, and a tie bar connecting the blocks with the stub axles projecting in opposite directions, and retainers carried by the car body for engagement with the said arms of the wheeled mountings to normally keep the latter from separating from the body when the latter is lifted.

9. In a mine car, the combination of a car body including a side sill having a horizontal flange at its lower portion, extending inwardly toward the longitudinal center of the body, said flange provided with a recess or opening, a wheel mounting for the car body including a stub axle and an axle holding block secured thereto upon which the car body normally bears, means carried by the car body for embracing said axle holding block, with limited play of the body and blocks, one with respect to the other, longitudinally and laterally of the car, the stub axle being insertable upwardly from beneath the car body, so that in assembling the stub axle may be passed thru and is disposed above the said recess or opening of the side sill when the wheel mounting is in supporting relation to the car body, and a retainer extending across the recess or opening of the side sill to prevent the wheel mounting from dropping from the car body when the latter is lifted or turned over on its side.

ARMISTEAD R. LONG.